July 21, 1959     W. L. ARCHER ET AL     2,895,934
RESINOUS COMPOSITIONS FROM COAL ACIDS AND ALCAMINES
AND METHOD FOR MAKING COMPOSITE PRODUCTS THEREOF
Filed Dec. 20, 1956

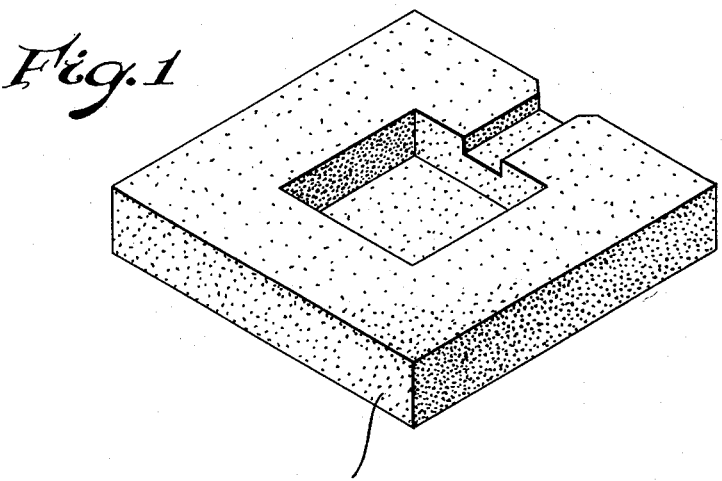

Fig. 1

Shell mold fabricated with thermoset resin binder comprised of coal acids and alcamine compound.

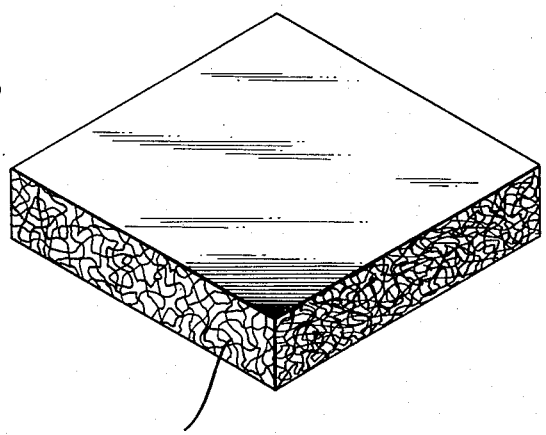

Fig. 2

Glass fiber mat bonded with thermoset resin binder comprised of coal acids and alcamine compound.

INVENTORS.
Wesley L. Archer
Robert S. Montgomery

BY Griswold & Burdick
ATTORNEYS

United States Patent Office 2,895,934
Patented July 21, 1959

2,895,934

RESINOUS COMPOSITIONS FROM COAL ACIDS AND ALCAMINES AND METHOD FOR MAKING COMPOSITE PRODUCTS THEREOF

Wesley L. Archer and Robert S. Montgomery, Midland, Mich., assignors to The Dow Chemical Company, Midland, Mich., a corporation of Delaware Application December 20, 1956, Serial No. 629,569

20 Claims. (Cl. 260—37)

This invention relates to thermosetting, resin-providing compositions that are comprised of certain cross-linkable reaction products or adducts of alcamine compounds with coal acids and which are capable of being cross-linked and thermally cured to resinous products having a pronounced utility for being employed in an adhesive capacity or as a binder material, or both, for any of a wide variety of inert filler substances. The invention bears especial reference to such resin-providing compositions that are exceptionally well-suited as a binder (or as a precursor thereof) for the preparation of formed composite structures with inert, silicious filler substances such as glass fibers and sand, in particular. The invention is also concerned with the integral formed composite structures that may be prepared and obtained by thermosetting and curing the resin-providing compositions after they have been dispersed over and throughout a desired inert filler substance.

It is among the principal objects of the invention to furnish thermosetting, resin-providing compositions that are comprised of the reaction products of alcamine compounds and polycarboxylic acids from the oxidation of coal and like carbonaceous materials.

It is also among the objects of the invention to furnish various thermoset resin products from such compositions as well as integral, composite structures that utilize them.

One particular object of the invention is to furnish a thermosetting resin-providing composition that is especially and advantageously adapted to function as a binder (or as a precursor thereof) for glass fibers and the like to obtain various desirable composite structures therewith including mats, panels and similar constructions.

Another particular object of the invention is to furnish a thermosetting resin-providing composition that is especially and advantageously adapted to function as a binder (or as a precursor thereof) for sand to prepare various desirable refractory structures therewith including shell molds, hot top devices and similar constructions.

A further object of the invention is to provide methods for the preparation of integral composite structures from inert filler substances, particularly silicious fillers such as glass fibers and sand, that utilize the resin-providing compositions of the invention.

Additional objects, purposes and advantages of the invention will be manifest in the following description and specification.

According to the invention, a thermosetting, resin-providing composition is comprised of a cross-linkable reaction product or adduct of an alcamine compound and a mixture of the polycarboxylic acids that may be obtained from the oxidation of coal and the like carbonaceous materials which, for convenience, are hereinafter referred to as coal acids. The cross-linkable coal acids adduct may advantageously be obtained as the reaction product of about equivalent amounts of the alcamine compound and the polycarboxylic coal acids starting material (taking the polyfunctionality of each of the reactant ingredients into account). This provides a coal acids adduct which has an optimum maximum potential for cross-linking and interreaction upon being subsequently thermoset and exposed to heat at elevated curing temperatures. However, if it is desired, suitable adducts for many purposes can also be obtained as the products of reactions between non-equivalent quantities of the polyfunctional reactants. Nonetheless, it is generally desirable for the proportions of either polyfunctional reactant that may be utilized in excess of strictly equivalent stoichiometric requirements to be maintained at less than about a 2:1 equivalent parts ratio.

The cross-linkable coal acids adduct may be readily and advantageously prepared in a suitable solvent medium, such as in water, low molecular weight alcohols such as methanol and ethanol and the like. In many instances, it may even be prepared in surplus quantities of the alcamine compound when it is available as a liquid having suitable fugacity to allow for its ready removal from the reaction mass when it is desired to terminate the adduct-forming reaction. The reaction between the polyfunctional reactants may generally be accomplished at normal room temperatures. It is usually exothermic in nature so as to frequently require that the reaction mass be cooled during the reaction in order to obtain optimum coal acids adducts. After their preparation, the coal acids adducts may be isolated from solution in the reaction mass and recovered, if so desired, as solids which have appearances that may vary from crystalline structures to somewhat glassy appearing products. In many instances, however, they may be utilized for subsequent application directly in the solution of the reaction mass in which they were obtained. The coal acids adducts, after their initial preparation, may be cross-linked and further self-reacted by subjecting them to heat at an elevated thermosetting and curing temperature in order to provide thermoset, cross-linked, cured resinous products that have the indicated characteristics and utilities.

Composite structures may be prepared by mixing or compounding one of the solid, cross-linkable coal acids adducts with a desired inert filler substance and subsequently thermosetting the adduct after it is in intimate association with the filler. In many cases, however, particularly for binding glass fibers and for preparing refractory compositions with sand and equivalent inert fillers, it may be of greater advantage and a more decided benefit to prepare the composite structures by first applying or interblending the cross-linkable coal acids adduct while it is in solution (which, as has been indicated, may be the solution in which it was prepared) to or with the inert filler substance and subsequently drying and heat curing the applied adduct to a cross-linked, thermoset resin structure that at least partially envelops and binds together or coalesces the inert filler.

While requirements may vary when preparing composite structures with individual inert filler substances and in other applications, it is usually desirable for many applications to employ a sufficient quantity of the cross-linkable adduct to ensure, upon curing of the formulated composition to a composite structure, that between about 2 and 15 percent by weight of the thermoset resin, based on the weight of the formulated composition, is present in the composite structure. However, for some purposes (according to conventional practices), much more of the resin may be required. Thus, when such fillers as wood flour are utilized or when certain fiber reinforced plastic structures are being fabricated, a major proportion of the composite structure, as in the neighborhood of 50 to 70 or more percent by weight, may advantageously consist of the resin binder.

The cross-linkable coal acids adducts of the invention may be thermoset and cured at applied temperatures or in curing atmospheres having temperatures between about 300° F. and 1200° F. for periods of time between about several seconds and several hours depending, as will be appreciated by those skilled in the art, upon the particular configuration and composition that is involved. Usually (and frequently necessarily) the thermosetting or curing times that are required are inversely proportional to the temperature that is utilized. The coal acid adducts of the invention, as a general rule, can be satisfactorily thermoset and cured to suitable resin structures by heating them to an actual resin temperature of between about 300° and 600° F. for a period of time between about 10 seconds or less and an hour or more, depending upon the particular heating techniques that are involved and the heat-exchanging efficiencies that are realized. Besides the more conventional means for heating, the resins may also be cured suitably under the influence of dielectric heating.

Although the resin-producing coal acid adducts of the present invention are adapted to be utilized in and of themselves in the preparation of moldings and other shaped articles, they are, as has been indicated, especially desirable for employment in or as thermosetting adhesives, binders, molding powders, fillers and the like in which capacity they may be utilized independently or in combination with other ingredients. Thus, they may be employed suitably as the adhesive ingredient in the production of ply-wood and similar laminate articles of construction. Particular benefit, as mentioned, may be derived when the adducts are employed as binders for the preparation of composite structures from various inert filler substances including silicious fillers, carbonaceous fillers (such as graphite, coke breeze, powdered coal and the like) and relatively analogous fillers including mineral and synthetic fibers, asbestos, fly ash, various blast furnace and powerhouse slags, mica flour, wood flour and the like fibrous or granular substances that are substantially inert to the resin-providing compositions and do not melt, fuse excessively or decompose at the thermosetting and curing temperatures which may be involved in the fabrication of the desired composite structures. Exceptional advantages are involved when such inert silicious filler substances as glass fibers and sand are bound together with the thermoset and cured coal acids adducts of the invention. One of the halves of a shell mold prepared from a sand composition coated with a thermosetting coal acids adduct in accordance with the invention is illustrated in Figure 1 of the accompanying drawing. A mat of glass fibers bound together with a cured resin from a coal acid adduct of the invention is depicted in Figure 2 of the drawing.

The coal acid adducts are particularly useful to form a resinous binder for glass fibers which is exceptionally resistant to failure due to such spontaneous combustion phenomenon which is frequently referred to as "punking." In the utilization of the adducts to prepare "punk-resistant" binders for glass fibers, it is generally preferred to apply the adduct from a relatively dilute solution, advantageously an aqueous solution, that contains between about 5 and 20 percent by weight, and more advantageously from about 6 to 12 percent by weight, based on the total weight of solution of the dissolved coal acids adduct. Enough of the solution should be applied to the mass of glass fibers to be bound to ensure that the desired quantity of the thermoset resin which is formed will be available for binding the fibers, taking into account such factors as solution drain-off and the like. A cured resin binder content between about 10 and 15 percent by weight is oftentimes satisfactory for most glass fiber mats. It is usually beneficial to permit excess quantities of the adduct-containing solution to drain-off before subjecting the intermediate mass to a suitable thermosetting and curing temperature. Mechanical means, such as aspirating or forced draft apparatus, may oftentimes be employed with advantage to accelerate the drainage of excess quantities of the coal acids adduct solution. The heat that is applied at the curing temperature may ordinarily be used with benefit to simultaneously dry the applied solution of the coal acids adduct dispersed on the mass of glass fibers prior to or during its cross-linking and thermosetting at the elevated thermal condition. The curing of the applied solution to form the binding resin for the glass fibers may generally be accomplished suitably at temperatures between about 300 and 600° F. for periods of time between about an hour and two minutes or so. Curing at 450–550° F. for 5 to 2 minutes is oftentimes highly satisfactory. The fibrous glass composite structures such as mats, batting, panels and the like that are bound together with the thermoset and cross-linked adducts of the invention are strong, relatively rigid, moisture-resistant and exceptionally resistant to punking. In the last-mentioned category in particular they are superior to the phenolic resin binders that have been utilized conventionally for such purposes.

The coal acids adducts are also extremely useful for the preparation of resin-bounded shell molds from sand and for like refractory structures. The shell molds which may be prepared with the resin-providing compositions of the invention may be fabricated in a manner similar to that which is utilized in the so-called Croning process which has been described in F.I.A.T. Final Report No. 1168 (dated May 30, 1947) by the Field Information Agency, Technical, United States Department of Commerce. Shell molds, as is well known, are finding increasing favor for employment in and to facilitate metal casting operations since they ameliorate many foundry techniques. They do not require the use of as much sand as is employed for conventional green sand mold-making operations and eliminate much of the hazard and unpleasantness due to dust and powder that obtains in the practice of the old technique. In addition, they generally permit better castings to be obtained and are lighter and less cumbersome to handle and manipulate than are conventional sand molds. The adducts may also be utilized, as has been mentioned, in sand compositions for the fabrication of hot top devices which are utilized in the pouring of hot top ingot molds of iron and steel and for similar refractory structures.

The sand compositions for refractory structures may be formulated by thoroughly intermixing the sand with the coal acids adduct after it has been dried to a cross-linkable powder. Or, with usually greater advantage, they may be prepared by intimately intermixing a relatively strong solution, such as an aqueous solution that contains at least about 50 and preferably in the neighborhood of 70 percent or more by weight, based on the weight of the solution of the dissolved cross-linkable adduct, with the sand by continuous or batch mulling or intensive mixing procedures. The coal acids adduct/sand compositions may either be fabricated as a wet mix into desired shapes prior to being thermoset or may be dried in a dry atmosphere at a non-thermosetting temperature of between about room temperature and 225° F. in order to form a particulate, coated sand composition that may be formed as a dry, free-flowing granular composition into desired structures prior to being completely thermoset.

While in the process of drying a wet sand mixture in this manner, it may often be beneficial to subject it to continued agitation in order to facilitate its being obtained in a suitable granular condition. It may also be beneficial to screen the dried, thermosetting coated sand formulation to obtain a desired particle size. In order to prepare shell molds in accordance with typical dump box techniques, it is usually preferred to dry the sand composition when it has been prepared by mixture with a solution of the cross-linkable coal acids adduct and to prepare the free-flowing coated sand by any desired granulation procedure so that its average particle size characteristics are such that the preponderance of the formulation, usually at least about 70 percent by weight, is not larger than about 40 mesh in the U.S. Standard Sieve Series.

In the preparation of sand compositions for refractory structures, it is desirable to employ a sufficient quantity of the coal acids adduct that is utilized to provide between about 2 and 15 and preferably between about 3 and 8 percent by weight of the cross-linked resin binder in the composition, based on the total weight of the composition. It is generally advantageous to utilize only as little a quantity of the resin binder in the composition for refractory structures as may be necessary in order to obtain suitably strong structures. In this way the refractory structures can be readily obtained with adequate porosity and minimized tendency to smoke and fire excessively during burn out or to cause carbonization when contacted by the molten metal that the structure is intended to receive.

The coal acids adduct/sand compositions, when they are prepared as dry, free-flowing, coated sand mixtures, may generally be pre-formed into a desired structure, such as a shell mold, by placing them in contact while in a suitably thick layer with or against a heated pattern for a period of time from about 20 to 60 seconds with pattern temperatures between about 500 and 800° F. Wet mixtures may generally be pre-formed into desired structures such as hot top devices or shell molds by compacting or compressing them against a suitable pattern or in a suitable mold form under pressures, for example, in the neighborhood of 80-120 pounds per square inch as may be developed with a hydraulic or pneumatic ram or the like. Core blowing techniques may also be employed to distribute a wet mixture against pattern surfaces or in mold forms. Regardless of whether dry or wet mixtures are used, the pre-formed structures may be suitably thermoset and cured by exposing them to temperatures between about 350 and 750° F. for periods of time between about 10 seconds and several minutes, depending again upon the particular configuration and composition that is involved in the structure being cured.

The cured refractory structures that may be obtained, including shell molds and hot top devices, are, as has been indicated, generally strong and rigid products. They have high gas permeabilities due to their excellent characteristics of porosity. They have good surface smoothness and dimensional stability which permit fine detail molds and the like for metal casting purposes to be obtained. In addition, the refractory structures that may be obtained by practice of the invention have little tendency to adhere to the surface of the hot metal after it has been cooled and solidified and may be readily stripped or removed therefrom, usually disintegrating easily and cleanly upon sharp impact or with other means for their physical removal.

The coal acids adduct/sand formulations that can be prepared with the resin-providing compositions of the invention have the significant advantage of being free from readily flammable substances and consequently safer to use, especially in the fabrication of shell molds, than are many of the phenolic resin coated sand compositions that have heretofore been used for such purposes.

Any ordinary sand (or other refractory material) that, advantageously, has a fineness in accordance with the values proposed by the American Foundryman's Society (AFS) which is in the numerical range between about 25 and 180 may be utilized for the preparation of refractory structures bound together with the thermoset, cross-link coal acids adducts of the invention. Such sands, for example, as the types known as Berkeley Float Sand, Juniata Sand, Lake Sand, Vassar Sand, Wedron Sand, Gratiot Bank Sand, Portage 40–60 Sand and the like may be beneficially employed. It is desirable that the sand be clean and substantially free from foreign metal oxides, clay, moisture and organic matter. In many cases it may be more advantageous to employ a granular refractory material for compositions intended for shell mold fabrication that has an AFS fineness number from about 50 to 125. Very frequently, sands having an AFS fineness number in the neighborhood of 100 may be preferable for shell mold purposes. Relatively coarse sands that have an AFS fineness number between about 25 and 75 are ordinarily more desirable for utilization in formulations with the coal acids adducts of the invention that are intended for fabrication into hot top devices and the like.

The coal acids that are employed to prepare the resin-providing adducts of the invention may be identical with or similar to those which may be obtained by the oxidation with gaseous oxygen, which may be contained in the air, of an aqueous alkaline slurry of a finely divided carbonaceous material selected from the group consisting of coal and coke that has been obtained by the carbonization of coal at temperatures beneath about 1300° F. Coal acids that have been prepared by the nitric acid oxidation of suitable carbonaceous materials are also generally satisfactory. Such coals that are of the varieties known as anthracite, bituminous, sub-bituminous and lignite and other low grade coals are generally suitable for production of coal acids. Satisfactory cokes are those produced according to conventional techniques from coal at a temperature beneath about 1300° F. The utilization of higher coking temperatures frequently causes the cokes that are obtained to be graphitic and rendered unsuitable for conversion to coal acids in satisfactory yields.

The free coal acids product is a hygroscopic, usually yellowish, essentially water-soluble material that is believed to be substantially comprised of various aromatic polycarboxylic acids. The average molecular weight of the coal acids that are ordinarily obtained is frequently in the neighborhood of 250. Their average equivalent weight is generally about 80 and seldom less than 75 or more than 90. They ordinarily appear to have an average of 2.5 to 5 carboxylic groups per molecule with an apparent average of 3 to 4 being common. While their exact chemical nature and constitution may be somewhat conjectural, they evidently contain considerable quantities of tri- and tetra-carboxylic benzene acids as well as aromatic acids having more complex nuclei. Frequently, for example, the greatly preponderant proportion of aromatic nuclei obtained in coal acids prepared in the described fashion have been found to consist of methylnaphthalene, benzene, biphenyl, naphthalene, phenanthrene, alkyl benzene, benzophenone and toluene nuclei.

The alcamine compounds that are employed in the practice of the invention to prepare the resin-providing coal acids adducts may be any aliphatic or alicyclic alkanolamine (which may also have aromatic nuclei in its molecular arrangement) that contains at least one amine group (preferably a secondary amine group) and at least one hydroxyl group in its molecule. Beneficially, the alcamine compounds that are utilized to react with the coal acids to form both ester and amide linkages in the thermosetting adducts and cured resins are selected from the group of such compounds that are represented by either of the formulae: $H_2N-R-OH$; $HO-R-NH-R-OH$; $(HOR)_3N$ and the like and analogous structures wherein each R may independently be any $C_2$ to $C_{12}$ aliphatic radical. Other functionally equivalent polyfunctional alcamine compounds may also be utilized. In the interests of economy, it is generally an advantage to employ relatively low molecular weight aliphatic alcamines or polyglycol polyamines for the preparation of the coal acids adducts. Alcamines that may be particularly included in this category include mono-, di- and tri-ethanolamine and mixtures thereof, propanolamine, butanolamine and the like monoamine and polyamine compounds containing one or more reactive hydroxyl groups.

By way of further illustration, a coal acids adduct was prepared by dissolving about 164 grams (2 equivalent weights) of coal acids, having an average molecular weight of about 250, in about 250 milliliters of methanol and adding to the resulting solution, via stillicide with continued efficient mixing, about 100 grams of monoethanolamine. At the termination of the exothermic reaction, during which the reaction mass was maintained at a temperature beneath about 120° F., the methanol was distilled off and the water of reaction stripped from the reaction mass until a pot temperature in the neighborhood of 300° F. was attained. Almost three hours of heating were required for this purpose. The excess monoethanolamine (about 30 grams) was then removed from the reaction mass by a vacuum distillation, with stirring, under an absolute mercury pressure of about 2 millimeters and a temperature of about 257° F. A relatively hard and glassy coal acids adduct was obtained which was completely soluble in water.

A dilute water solution of the monoethanolamine/coal acids adduct containing about 10 percent by weight thereof was applied to a mat of glass fibers that weighed about 3 ounces and had dimensions of about 1 x 4 x 6 inches. The excess solution was removed from the mat with the assistance of a box over which the glass fiber mat fit. The resultant mat, containing about 10–15 percent by weight of the resin binder, was cured in an electric oven at a temperature of about 500° F. for an hour. The cured mat had a light tan colored surface and also had excellent strength and rigidity. In addition, it had excellent resistance to punking as evidenced by a test in which a red hot copper rivet was dropped in the test mat in order to observe the speed and degree of burn off of the binder. Its performance in this respect was superior to that obtained with a conventional phenolic resin glass fiber binder. Similar results were obtained when 7–8 percent by weight aqueous solution of adducts containing 1:1 and 2:1 equivalent ratios of monoethanolamine to coal acids, respectively, were applied to 7 to 9 pounds per cubic foot glass fiber mats which, after draining, were cured for about 4 minutes at 500–540° F. In addition to good bonding and excellent resistance to punking, the bonded mats had highly satisfactory moisture resistance (swelling less than 6–12 percent after exposure for 96 hours at 120° F. to an atmosphere with 95 percent relative humidity) and no appreciable corrodent tendencies on cold rolled steel, aluminum and copper (tested in contact with the mat in the humidity chamber).

An adduct of about equivalent proportions of diethanolamine and coal acids was prepared in a manner analogous to that utilized for the foregoing monoethanolamine/coal acids adduct. A 70 percent by weight solution of the diethanolamine adduct in water was mixed with various batches of AFS 100 Vassar Bank Sand and subsequently dried and screened to prepare coated sand mixtures suitable for shell molding purposes that had adduct contents between about 4 and 8 percent by weight. Various types of shell molds were prepared by standard dump box techniques with each of the coated sand mixtures, using patterns heated to temperatures between about 600 and 700° F. with contact times thereon ranging from 20 to 60 seconds. The pre-formed shell molds were subsequently thermoset and cured for about one minute periods at temperatures of about 650–700° F. The shell molds that were obtained were strong, good quality specimens that permitted the preparation of excellent castings when employed for such purposes. They had tensile strengths that ranged from about 300 to 700 pounds per square inch and had rupture and compressive strength values commensurate with equivalent shell molds prepared with conventional novolak type phenolic resin binders.

In a similar manner, sand mixtures were prepared containing 4 to 10 percent by weight of the diethanolamine/coal acids adduct from the 70 percent solution and AFS 33 Portage 40–60 Sand. The mixtures were wet pressed into hot top devices which were cured at about 500° F. for about one hour periods. The resulting structures were found to hold molten iron with ease and to be readily strippable from the solidified metal upon cooling.

What is claimed is:

1. Thermosetting, cross-linkable composition comprised of an adduct of coal acids and an alcamine compound, said alcamine compound containing at least one reactive amine group and at least one reactive hydroxyl group in its molecule, said coal acids being the water-soluble, mixed aromatic polycarboxylic acids of the class that are the products of the oxidation of coal, which acids have an average molecular weight of about 250, an average equivalent weight of from about 75 to about 90 and contain an average of from about 2.5 to 5 carboxylic groups per aromatic nucleus in their molecule.

2. The composition of claim 1, wherein the adduct consists of about equivalent weight proportions of the coal acids and the alcamine compound.

3. The composition of claim 1, wherein the alcamine compound is monoethanolamine.

4. The composition of claim 1, wherein the alcamine compound is diethanolamine.

5. The composition of claim 1, wherein the alcamine compound is triethanolamine.

6. The composition of claim 1, characterized in being thermosetting when heated to a temperature between about 300 and 600° F.

7. A thermoset, cross-linked resinous product comprising a cured composition in accordance with the composition set forth in claim 1.

8. Thermosetting mass for forming integral composite structures consisting of an inert filler substance blended with a resin-producing composition comprised of an adduct of coal acids and an alcamine compound, said alcamine compound containing at least one reactive amine group and at least one reactive hydroxyl group in its molecule, said coal acids being the water-soluble, mixed aromatic polycarboxylic acids of the class that are the products of the oxidation of coal, which acids have an average molecular weight of about 250, an average equivalent weight of from about 75 to about 90 and contain an average of from about 2.5 to 5 carboxylic groups per aromatic nucleus in their molecule.

9. The thermosetting mass of claim 8, containing a minor proportion of about 2 percent by weight, based on the weight of the mass, of the resin-producing adduct blended with the inert filler substance.

10. The thermosetting mass of claim 8, containing an amount of the resin-producing adduct blended with the inert filler substance that is adapted to provide between about 2 and 15 percent by weight of resin binder in the mass when it is cured.

11. The thermosetting mass of claim 8, wherein the inert filler is a silicious filler substance.

12. A thermosetting mass in accordance with that set forth in claim 11, wherein the inert, silicious filler substance is glass fibers.

13. A thermosetting mass in accordance with that set forth in claim 11, wherein the inert, silicious filler substance is sand.

14. Method for the fabrication of thermoset, integral composite structures which comprises blending an inert filler substance with a minor proportion of about 2 percent by weight, based on the weight of the mass, of a resin-providing composition comprised of an adduct of coal acids and an alcamine compound, said alcamine compound containing at least one reactive amine group and at least one reactive hydroxyl group in its molecule, said coal acids being the water-soluble, mixed aromatic polycarboxylic acids of the class that are the products of the oxidation of coal, which acids have an average molecular weight of about 250, an average equivalent weight of from about 75 to about 90 and contain an average of from about 2.5 to 5 carboxylic groups per aromatic nucleus in their molecule; and sequentially subjecting the blend to thermosetting and curing heats at elevated thermosetting and curing temperatures to heat said adduct in said blend to an actual temperature between about 300° F. and about 600° F. until said adduct is cured.

15. The method of claim 14 and including the step of forming the blended ingredients to a desired shape prior to subjecting them to said thermosetting temperature.

16. The method of claim 14, wherein the inert filler substance and the resin-providing adduct are dry-blended.

17. The method of claim 14, wherein the inert filler substance is blended with the resin-providing adduct by mixing a solution of the latter with the former.

18. Method for the preparation of composite glass fiber structures which comprises applying to a mass of glass fibers a solution of a resin-providing composition comprised of an adduct of coal acids and an alcamine compound, said alcamine compound containing at least one reactive amine group and at least one reactive hydroxyl group in its molecule, said coal acids being the water-soluble, mixed aromatic polycarboxylic acids of the class that are the products of the oxidation of coal, which acids have an average molecular weight of about 250, an average equivalent weight of from about 75 to about 90 and contain an average of from about 2.5 to 5 carboxylic groups per aromatic nucleus in their molecule; draining excess solution from the mass of glass fibers so that between about 10 and 15 percent by weight, based on the final weight of the composite structure, of the cured resin from the resin-providing adduct is intimately blended throughout the mass of glass fibers; and subsequently subjecting the blended mass to thermosetting and curing heats at elevated thermosetting and curing temperatures to heat said adduct applied to said glass fibers in said mass to an actual temperature between about 300° F. and 600° F. until said adduct is cured.

19. Method for the fabrication of refractory structures which compress blending sand with a solution of a resin-providing composition comprised of an adduct of coal acids and an alcamine compound in an amount to provide between about 3 and 8 percent by weight, based on the weight of the refractory structure, of the cured resin from the resin-providing adduct in the sand blend, said alcamine compound containing at least one reactive amine group and at least one reactive hydroxyl group in its molecule, said coal acids being the water-soluble, mixed aromatic polycarboxylic acids of the class that are the products of the oxidation of coal, which acids have an average molecular weight of about 250, an average equivalent weight of from about 75 to about 90 and contain an average of from about 2.5 to 5 carboxylic groups per aromatic nucleus in their molecule; forming the blended sand to a desired shape; and subsequently subjecting the formed mass to thermosetting and curing heats at elevated thermosetting and curing temperatures to heat said resin-providing adduct blended with said sand to an actual temperature between about 300° F. and about 600° F. until said adduct is cured.

20. The method of claim 19, wherein the refractory structure is a shell mold and including the steps of drying the wet blended sand to a granular, free-flowing mass after mixing it intimately with the solution of the resin-providing adduct and pre-forming the shell mold on a pattern heated to a temperature between about 500° F. and about 800° F. for a period of time between about 20 seconds and about 60 seconds prior to thermosetting and curing the resulting shell mold structure.

References Cited in the file of this patent

UNITED STATES PATENTS 2,440,516    Kropa _____ Apr. 27, 1948

OTHER REFERENCES

Valyi: "After Three Years: Developments in Shell Molding," American Foundryman, May 1954, pages 138–143.